United States Patent
Takenaka et al.

[19]

[11] Patent Number: 6,034,315

[45] Date of Patent: Mar. 7, 2000

[54] SIGNAL PROCESSING APPARATUS AND METHOD AND INFORMATION RECORDING APPARATUS

[75] Inventors: Yoshihiko Takenaka; Junichi Imamura, both of Tokorozawa, Japan

[73] Assignee: Pioneer Electronic Corporation, Japan

[21] Appl. No.: 09/143,618

[22] Filed: Aug. 28, 1998

[30] Foreign Application Priority Data

Aug. 29, 1997 [JP] Japan .................................. 9-233416

[51] Int. Cl.⁷ ..................................................... G10H 1/18
[52] U.S. Cl. .................. 84/615; 84/609; 84/618; 84/653; 84/656; 84/DIG. 9
[58] Field of Search .............................. 84/609, 615–616, 84/618–619, 649, 653–654, 656–657, 603, 453, DIG. 9; 369/59

[56] References Cited

U.S. PATENT DOCUMENTS 5,552,896  9/1996  Yoshida ................................. 358/342
5,859,826  1/1999  Ueno et al. ............................ 369/59

*Primary Examiner*—Robert E. Nappi
*Assistant Examiner*—Marlon T. Fletcher
*Attorney, Agent, or Firm*—Nixon & Vanderhye

[57] ABSTRACT

A signal processing apparatus is provided with: a music tone judging device for judging a music tone or genre of a music composition composed of an input audio signal: a selecting device for selecting one of a plurality of characteristics prepared in advance for each parameter used for a compression encoding method on the basis of a judgment result of the music tone judging device; and an encoding device for generating a spectrum signal out of the input audio signal and compression-encoding the generated spectrum signal on the basis of the selected characteristic.

16 Claims, 7 Drawing Sheets

SIGNAL PROCESSING APPARATUS AND METHOD AND INFORMATION RECORDING APPARATUS

BACKGROUND OF THE INVENTION

1. Field of the Invention

The present invention relates to a signal processing apparatus and a signal processing method, and more particularly relates to the signal processing apparatus for and the signal processing method of processing a signal at a time of recording an audio signal onto an information record medium such as an MD (Mini Disc) in an information recording apparatus.

2. Description of the Related Art

In order to compress the information amount or volume for the MD to about one fifth of that of a CD (Compact Disc), an audio data high efficiency encoding method, which is so called as an ATRAC (Adaptive TRansform Acoustic Coding), is employed. The theory of the ATRAC is to perform a compression of the information by removing a redundant portion of the information signal, which are not sensible by a human being with consideration of the auditory sense of the ears of the human being. In other words, on an assumption that a difference between the original signal and the signal after compression is generated (i.e., the quantization noise is generated), the compression is performed while controlling the quantization noise so as not to be audible for the human being.

More concretely, in the ATRAC, the high efficiency encoding method is performed by use of the masking effect and the loudness characteristic related to the property on the auditory sense of the human being (i.e., the minimum audible limit curve). This method is explained with an example. In FIG. 7A, a minimum audible limit curve 100 is indicated. The audio sound at the level below the curve 100 cannot be heard by the ears of the human being. Now, assuming that a sound A and a sound B indicated on the graph of FIG. 7A are included in the input signal, the sound B is audible by the human being but the sound A is not audible by the human being since it is positioned on the graph at a position below the minimum audible limit curve 100. Therefore, in the ATRAC, the sound B is recorded as the effective signal. On the other hand, the sound A is not recorded (thinned out), or is encoded while drastically reducing the quantization bit amount.

In FIG. 7B, in addition to the minimum audible limit curve 100, a masking characteristic curve 110 due to a sound C is indicated. Although the sound B is positioned on the graph at a position above the minimum audible limit curve 100, the sound B cannot be heard by the ears of the human being since it is masked by the sound C positioned at the vicinity of the sound B on the graph. Therefore, in the ATRAC, the sound B is also removed as the redundant component and is then compressed.

As explained above with the example, the signal compressing method in the ATRAC depends on how to set the minimum audible limit curve, the masking characteristic and so on, which are the parameters in the compressing process. Here, the compression encoding process by means of the ATRAC is performed by use of just one set of the minimum audible limit curve, the masking characteristic and so on, which are predetermined in advance.

However, the record signal or the music impression for the human being is quite different depending upon the setting of the minimum audible limit curve and/or the masking characteristic used for performing the compression encoding process by means of the ATRAC. Therefore, if a plurality of music compositions in various music tones or genres are recorded by use of just one fixed set of these characteristics, an optimum compression encoding process cannot be always applied to the original sounds (i.e., the original music composition), so that a case may be raised in which the recording operation suitable for each music composition cannot be performed e.g., the once recorded and reproduced music composition does not give any force or good impression to the audience or the high frequency component of the once recorded and reproduced music composition jars on the ears of the human being.

SUMMARY OF THE INVENTION

It is therefore an object of the present invention to provide a signal processing apparatus, a signal processing method and an information recording apparatus including the signal processing apparatus, which can perform the compression encoding process by use of a characteristic, such as a minimum audible limit curve, a masking characteristic or the like, suitable for each music tone or genre of an individual music composition to be recorded onto an information record medium such as an MD.

The above object of the present invention can be achieved by a signal processing apparatus provided with: a music tone judging device for judging a music tone or genre of a music composition composed of an input audio signal: a selecting device for selecting one of a plurality of characteristics prepared in advance for each parameter used for a compression encoding method on the basis of a judgment result of the music tone judging device; and an encoding device for generating a spectrum signal out of the input audio signal and compression-encoding the generated spectrum signal on the basis of the selected characteristic.

According to the signal processing apparatus of the present invention, when the input audio signal is inputted to the signal processing apparatus, the music tone or genre of the music composition composed of the input audio signal is judged (or analyzed) by the music tone judging device. Then, on the basis of the judgment result of the music tone judging device, one of a plurality of characteristics prepared in advance for each parameter used for the compression encoding method is selected by the selecting device. Then, by the encoding device, the spectrum signal is generated out of the input audio signal and the generated spectrum signal is compression-encoded on the basis of the selected characteristic.

Therefore, it is possible to perform the compression encoding process by use of the characteristic appropriate for the music tone or genre of the input audio signal.

In one aspect of the signal processing apparatus of the present invention, the music tone judging device continually judges the music tone or genre, and the selecting device selects one of the characteristics in a real time manner while the input audio signal is being inputted.

According to this aspect, while the input audio signal is being inputted to the signal processing apparatus, the music tone or genre is continually judged (or analyzed) by the music tone judging device, and one of the characteristics is selected in the real time manner by the selecting device. Therefore, it is possible to perform the compression encoding process by following the change in the music tone or genre and using the optimum characteristic even if the music tone or genre is changed in the middle of the music composition.

In another aspect of the signal processing apparatus of the present invention, the music tone judging device is provided with: a band-dividing device for dividing the input audio signal into signal components in a plurality of frequency bands; a peak level detecting device for detecting a peak level of each of the signal components; and a peak level based judging device for judging the music tone or genre on the basis of the detected peak level.

According to this aspect, in the music tone judging device, at first, the input audio signal is divided into the signal components in a plurality of frequency bands, by the band-dividing device. Then, the peak level of each of the signal components is detected by the peak level detecting device. Then, by the peak level based judging device, the music tone or genre is judged on the basis of the detected peak level. Therefore, the music tone or genre can be finely judged on the basis of the signal components in each frequency band. In addition, since the music tone or genre judgment is performed on the basis of the peak level, the signal processing apparatus can be constructed by use of a relatively simple structure.

In this aspect, the band-dividing device may be provided with a plurality of filters each for only passing the signal component in respective one of the frequency bands, and the peak level detecting device may be provided with a plurality of level detecting circuits each for detecting the peak level.

In this case, the input audio signal is divided into the signal components in a plurality of frequency bands, by the filters such as a low pass filter, a band pass filter and the like. Then, the peak level of each of the signal components is detected by respective one of the level detecting circuits. Therefore, the signal processing apparatus can be constructed by use of a relatively simple structure.

In another aspect of the signal processing apparatus of the present invention, the characteristics include at least one of a minimum audible limit characteristic and a masking characteristic.

According to this aspect, at least one of the minimum audible limit characteristic and the masking characteristic is selected by the selecting device. Then, by the encoding device, the generated, spectrum signal is compression-encoded on the basis of the selected characteristic. Therefore, on the basis of the minimum audible limit characteristic and/or the masking characteristic optimally selected for the music tone or genre of the input audio signal, the compression encoding process can be performed.

In another aspect of the signal processing apparatus of the present invention, the characteristics include at least one of a bit allotment and a time width of a time unit by which the encoding device compression-encodes the generated spectrum signal.

According to this aspect, at least one of the bit allotment and the time width of the time unit such as a sound group or the like is selected by the selecting device. Then, by the encoding device, the generated spectrum signal is compression-encoded on the basis of the selected characteristic. Therefore, on the basis of the bit allotment and/or the time width of the time unit optimally selected in for the music tone or genre of the input audio signal, the compression encoding process can be performed.

In another aspect of the signal processing apparatus of the present invention, the encoding device is provided with an ATRAC encoder.

According to this aspect, it is possible to perform the compression encoding process by means of the ATRAC method.

In another aspect of the signal processing apparatus of the present invention, the apparatus is further provided with an A/D converter for converting the input audio signal from an analog form to a digital form, and outputting the input audio signal in the digital format to the music tone judging device and the encoding device.

According to this aspect, the input audio signal in, the analog form is inputted to the A/D converter. Then, the input audio signal in the digital form is outputted from the A/D converter to the music tone judging device and the encoding device.

Therefore, it is possible to perform the compression encoding process for the input audio signal in the analog form.

The above object of the present invention can be also achieved by an audio information recording apparatus including (i) the above described signal processing apparatus of the present invention for processing the input audio signal to output a processed audio signal and (ii) a recording unit for recording the processed audio signal it onto an information record medium.

According to the audio information recording apparatus of the present invention, at first, the input audio signal is processed by the above described signal processing apparatus of the present invention. Then, the processed audio signal is recorded onto the information record medium such as an MD or the like, by the recording unit. Therefore, it is possible to record the input audio signal in the compression encoded format while the quality of the input audio signal is hardly degraded by the compression encoding process.

The above object of the present invention can be also achieved by an audio information recording and reproducing apparatus including (i) the above described signal processing apparatus of the present invention for processing the input audio signal to output a processed audio signal, (ii) a recording unit for recording the processed audio signal onto an information record medium and (iii) a reproducing section for reproducing the recorded audio signal from the information record medium.

According to the audio information recording and reproducing apparatus of the present invention, at first, the input audio signal is processed by the above described signal processing apparatus of the present invention. Then, the processed audio signal is recorded onto the information record medium such as an MD or the like, by the recording unit. Then, the recorded audio signal is reproduced from the information record medium by the reproducing section. Therefore, it is possible to record and reproduced the input audio signal in the compression encoded format while the quality of the input audio signal is hardly degraded by the compression encoding process.

The above object of the present invention can be also achieved by a signal processing method having: a music tone judging process of judging a music tone or genre of a music composition composed of an input audio signal: a selecting process of selecting one of a plurality of characteristics prepared in advance for each parameter used for a compression encoding method on the basis of a judgment result of the music tone judging process; and an encoding process of generating a spectrum signal out of the input audio signal and compression-encoding the generated spectrum signal on the basis of the selected characteristic.

According to the signal processing method of the present invention, at first, in the music tone judging process, the music tone or genre of the music composition composed of the input audio signal is judged. Then, in the selecting process, on the basis of the judgment result of the music tone judging process, one of a plurality of characteristics prepared in advance for each parameter used for the compression encoding method is selected. Then, in the encoding process, the spectrum signal is generated out of the input audio signal, and the generated spectrum signal is compression-encoded on the basis of the selected characteristic.

Therefore, in the same manner as the above described signal processing apparatus of the present invention, it is possible to perform the compression encoding process by use of the characteristic appropriate for the music tone or genre of the input audio signal.

In one aspect of the signal processing method of the present invention, the music tone judging process continually judges the music tone or genre, and the selecting process selects one of the characteristics in a real time manner while the input audio signal is being inputted.

Therefore, it is possible to perform the compression encoding process by following the change in the music tone or genre and using the optimum characteristic even if the music tone or genre is changed in the middle of the music composition.

In another aspect of the signal processing method of the present invention, the music tone judging process is provided with: a band-dividing process of dividing the input audio signal into signal components in a plurality of frequency bands: a peak level detecting process of detecting a peak level of each of the signal components; and a peak level based judging process of judging the music tone or genre on the basis of the detected peak level.

Therefore, the music tone or genre can be finely judged on the basis of the signal components in each frequency band.

In another aspect of the signal processing method of the present invention, the characteristics include at least one of a minimum audible limit characteristic and a masking characteristic.

Therefore, on the basis of the minimum audible limit characteristic and/or the masking characteristic optimally selected for the music tone or genre of the input audio signal, the compression encoding process can be performed.

In another aspect of the signal processing method of the it present invention, the characteristics include at least one of a bit allotment and a time width of a time unit by which the encoding device compression-encodes the generated spectrum signal.

Therefore, on the basis of the bit allotment and/or the time width of the time unit optimally selected for the music tone or genre of the input audio signal, the compression encoding process can be performed.

In another aspect of the signal processing method of the present invention, the encoding process is a process by means of an ATRAC method.

According to this aspect, it is possible to perform the compression encoding process by means of the ATRAC method.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, an embodiment of the present invention will be now explained.
(Principle)

At first, the principle of the present invention is explained in brief. As mentioned before, in case of the compression encoding process by means of the ATRAC, it is important to set the parameters used for the compression encoding process. More concretely, it is important to actually set the minimum audible limit curve, the masking characteristic, the time width when time-dividing the signal to be encoded into signal portions (e.g., into a plurality of sound groups described later) and so on. Depending upon these settings, the impression of the music composition varies in great degrees. In view of the above, in the present invention, the music tone or genre of the music signal to be recorded is analyzed and judged in a real-time manner, so that the optimum characteristic for each parameter in the compression encoding process are selected from among a plurality of characteristic for each parameter prepared in advance, and are actually used for the compression encoding process. By this, the optimum compression encoding process by use of the optimum characteristics in accordance with the music tone or genre of the music composition to be recorded can be performed.
(MD Recording Apparatus)

Figure 1:
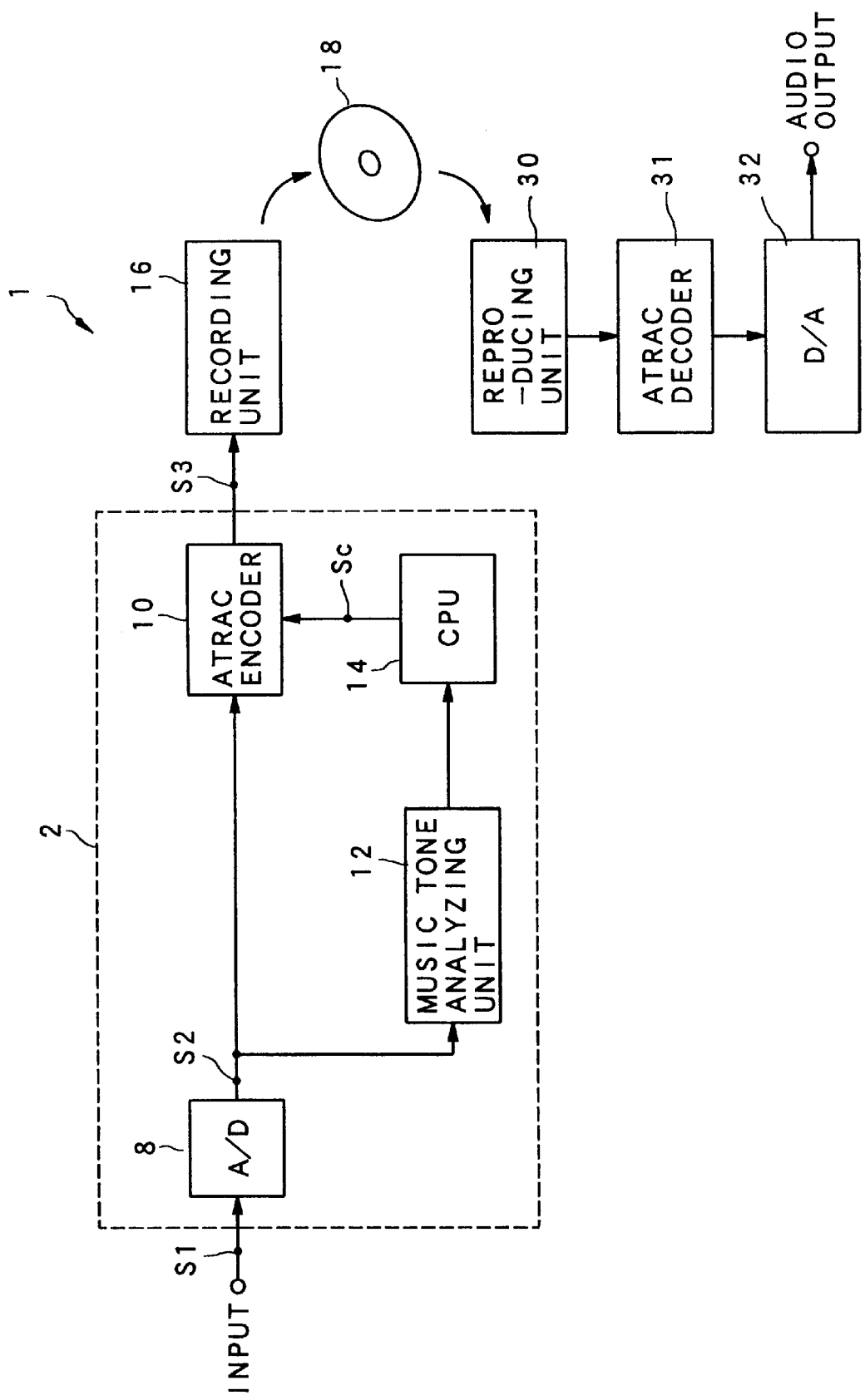
FIG. 1 is a block diagram of an MD recording apparatus including a signal processing apparatus as an embodiment of the present invention.

Next, a preferred embodiment of the present invention will be explained with reference to the drawings. FIG. 1 is a block diagram of an MD recording apparatus including a signal processing apparatus of the present invention.

In FIG. 1, an MD recording apparatus 1 includes a signal processing apparatus 2. The signal processing apparatus 2 is provided with an A/D (Analog to Digital) converter 8, an ATRAC encoder 10, a music tone analyzing unit 12 and a CPU (Central Processing Unit) 14. The MD recording apparatus 1 also includes a recording unit 16, a reproducing unit 30, an ATRAC decoder 31 and an D/A (Digital to Analog) converter 32.

At the time of recording the audio signal, an input signal S1 to be recorded onto an MD 18 is inputted to the A/D converter 8, is sampled by a sampling frequency of 44.1 kHz and is quantized by 16 to 20 bits for example, to be outputted as a digital signal S2. Then, the digital signal S2 is sent to the ATRAC encoder 10 and the music tone analyzing unit 12.

On the other hand, at the time of reproducing the audio signal from the MD 18 by the MD recording apparatus 1, the compression-encoded digital signal is read out from the MD 18 by the reproducing unit 30, is expansion-decoded by the ATRAC decoder 31 and is D/A converted by the D/A converter 32, so that the analog output corresponding to the input signal Si is outputted through a speaker or headphone.

Figure 2:
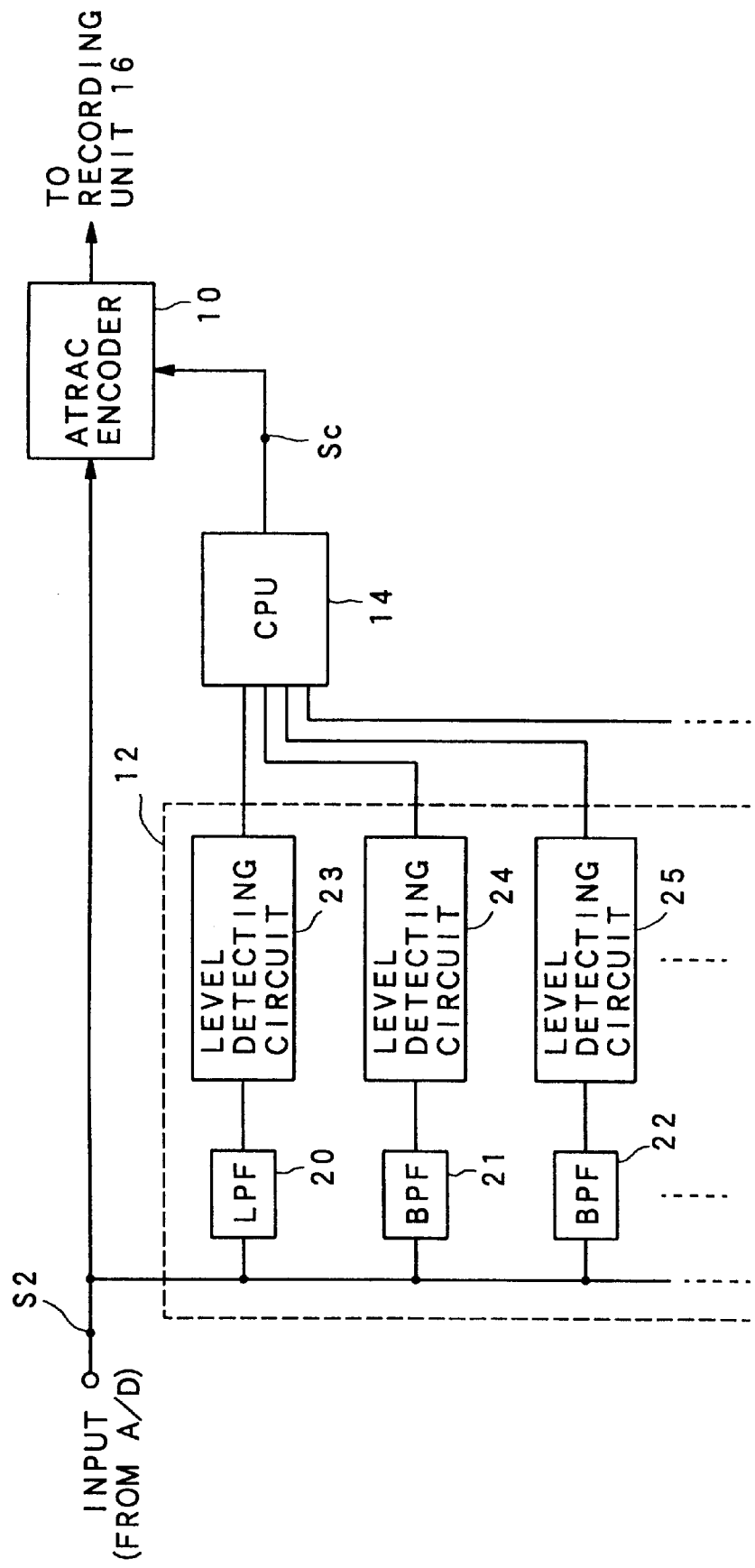
FIG. 2 is a block diagram of a music tone analyzing unit of the signal processing apparatus of FIG. 1.

FIG. 2 shows a structure of the music tone analyzing unit 12. The music tone analyzing unit 12 is provided with a low pass filter 20 and a plurality of band pass filters 21, 22, . . . , so as to band-divide the digital signal S2 (i.e., divide the digital signal S2 into a plurality of frequency component of different frequency bands) inputted from the A/D converter 8. Preferably, the frequency bands for this dividing process are coincident to 3 frequency bands, which are band-divided in the ATRAC encoder 10 (e.g., about 0 to 5.5 kHz for the low band, about 5.5 to 11 kHz for the medium band, and about 11 to 22 kHz for the high band). This is because the compression encoding process is performed in the ATRAC encoder 10 by band-dividing the digital signal S2 into signal components in these 3 frequency bands and then applying the minimum audible limit curve or the like thereto. It is also possible to perform the analysis for each fine frequency band, after dividing the digital signal S2 into the signals components in frequency bands more finely than the 3 frequency bands. As for each filter, it is preferable to employ a QMF (Quadrature Mirror Filter). This is because aliasing components generated by the band-dividing process can be canceled upon synthesizing the frequency bands. It is also possible to employ filter structures in various types other than the QMF.

The signal components which have been band-divided are inputted to level detecting circuits 23, 24, 25, . . . , respectively. Each of the level detecting circuits 23, 24, 25, . . . , detects the peak (maximum) level of the inputted signal component in respective one of the frequency bands for each predetermined time width, and sends the detected peak level to the CPU 14. At this time, the time width for detecting the peak level is preferably set to one "sound-group", which is a minimum unit for time-dividing the music signal within the ATRAC encoder 10 (which is also called as one "encode block", and is a time width of 11.6 msec at the maximum). This is because the ATRAC encoder 10 at the later stage performs the compression encoding process of the signal by use of this sound group unit and that it is appropriate to analyze the music tone or genre by use of the time unit same to this. Nevertheless, in case that the analysis by one sound group unit is difficult or impossible since a considerable time duration is required for the transmission of each of microcomputers, LSIs and the like, the analysis and judgment may be performed by employing as the unit a time width corresponding to a plurality of sound groups.

The CPU 14 receives detection signals from the level detecting circuits 23, 24, 25, . . . , and determines the characteristic of each parameter (e.g., the bit allotment and the time width of the sound group, the minimum audible limit curve, the masking characteristic) to be used for the encoding process in the ATRAC encoder 10 on the basis of the content of the received detection signals, and sends a selection signal Sc to select the appropriate characteristics to the ATRAC encoder 10.

The CPU 14 judges the music tone or genre. For example, the CPU 14 judges whether there is a large or small amount of signal component with a low level in the high band out of the digital signal S2, whether the level variation of the signal component in the middle band is large or small and soon, and then determines the bit allotment and the time width of the sound group, the minimum audible limit characteristic curve, the masking characteristic and the like, each of which is estimated to be optimum for each individual case. The concrete determining method here will be described later in detail.

The ATRAC encoder 10 prepares a plurality of characteristics usable for the encoding process in advance as for each parameter, and is adapted to select one of the characteristics in accordance with the selection signal Sc from the external. For example, a plurality of characteristics for each parameter are prepared as following. Namely, at first, it is possible to select one of the time width of 11.6 msec, which is the maximum value prescribed on the ATRAC, and other time widths shorter than this maximum value as the time width of the sound group. The bit allotment can be determined arbitrarily. A plurality of minimum audible limit curves are prepared, such as a curve whose level is high in general, a curve whose level is low in general, a curve whose level is more or less high (or low) on the high frequency side and so on. A plurality of masking characteristics are prepared, such as a characteristic curve which is steep (i.e., by which it is difficult to mask the signal at the vicinity thereof), a characteristic curve which is gentle (i.e., by which it is easy to mask the signal at the vicinity thereof) and so on. Then, on the basis of the selection signal Sc supplied by the CPU 14, the compression encoding process is performed in the ATRAC encoder 10 while selecting the optimum characteristics one by one for each parameter. Therefore, on the basis of the music tone or genre of the input signal, the characteristics used in the ATRAC encoder 10 are changed every moment as the occasion demands at the time of actually performing the compression encoding process.

An encoded signal S3, which has been compression-encoded in the above described manner, is sent to the recording unit 16 and is recorded onto the MD 18.

Next, the method of determining the characteristic for each parameter, which is performed by the music tone analyzing unit 12 and the CPU 14, is explained. The characteristics changeable in the ATRAC encoder 10 are (i) the bit allotment and the time width of the sound group, (ii) the minimum audible limit curve and (iii) the masking characteristic in the present embodiment. These are explained in the order.

(i) Bit Allotment and Time Width of Sound Group

In case of the ATRAC, the input signal to be encoded is divided into signal portions of every predetermined time width. One unit of such a divided time width or time window is called as a sound group (or an encode block). This sound group is prescribed as a time width of 11.6 msec at the maximum thereof according to the ATRAC. Therefore, it is possible to perform the compression encoding process by use of a plurality of time widths within the range not longer (wider) than this maximum value. Further, it is possible to arbitrarily determine the allotment of the quantization bit number with respect to each sound group.

Figure 3A:
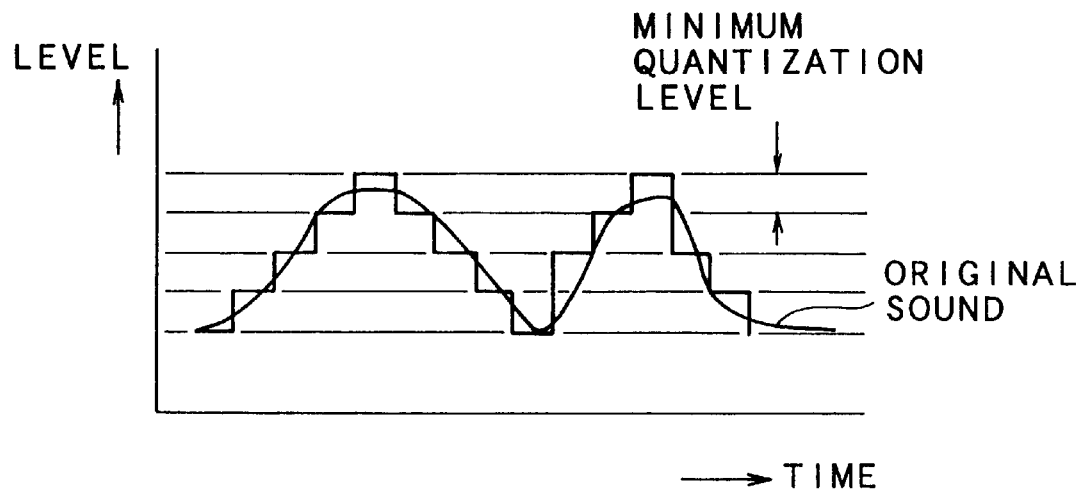
FIG. 3A is a graph showing a compression encoding process by means of the ATRAC with one bit allotment.
Figure 3B:
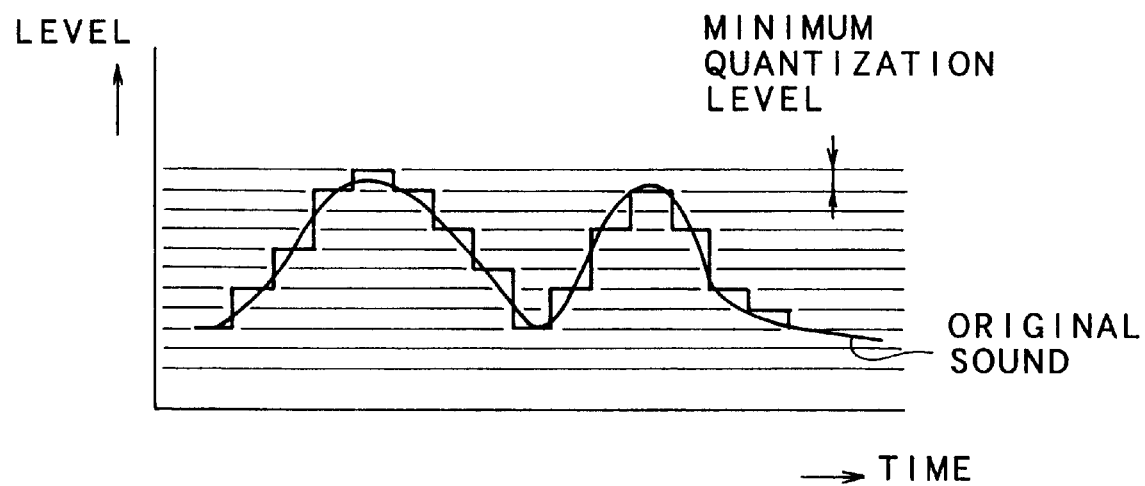
FIG. 3B is a graph showing the compression encoding process by means of the ATRAC with another bit allotment.

FIG. 3A shows an example of the bit allotment of the sound group in a condition where the bit allotment is relatively small, while FIG. 3B shows an example of the bit allotment of the sound group in a condition where the bit allotment is relatively large. By increasing the bit allotment from the condition as indicated by FIG. 3A to the condition as indicated by FIG. 3B, it is possible to perform the encoding process with a less quantization noise.

Figure 4A:
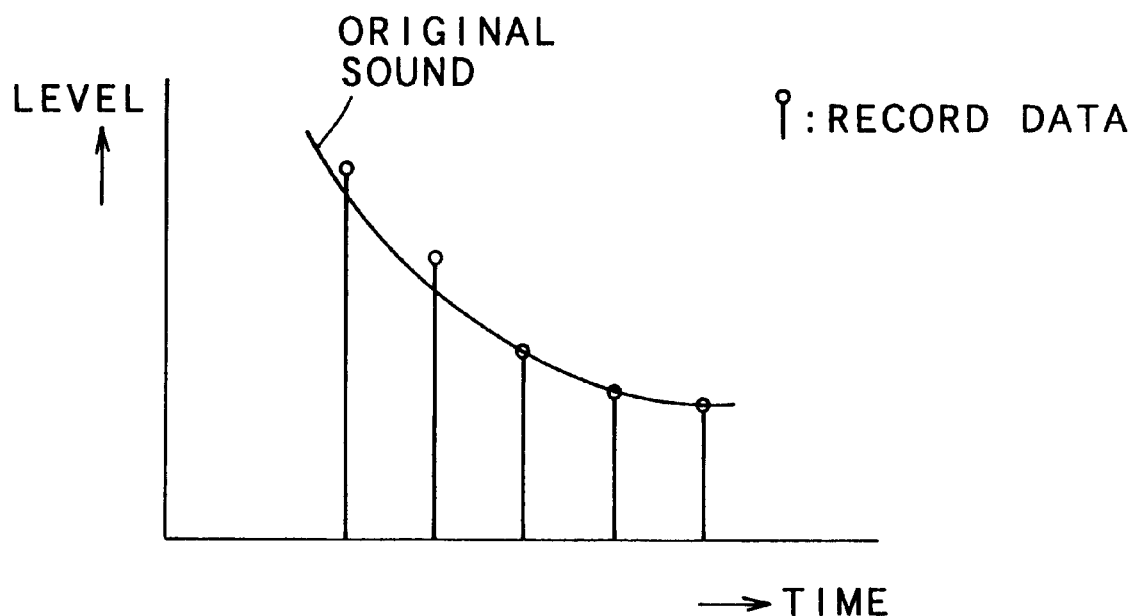
FIG. 4A is a graph showing the compression encoding process by means of the ATRAC with one bit allotment for a sound group.
Figure 4B:
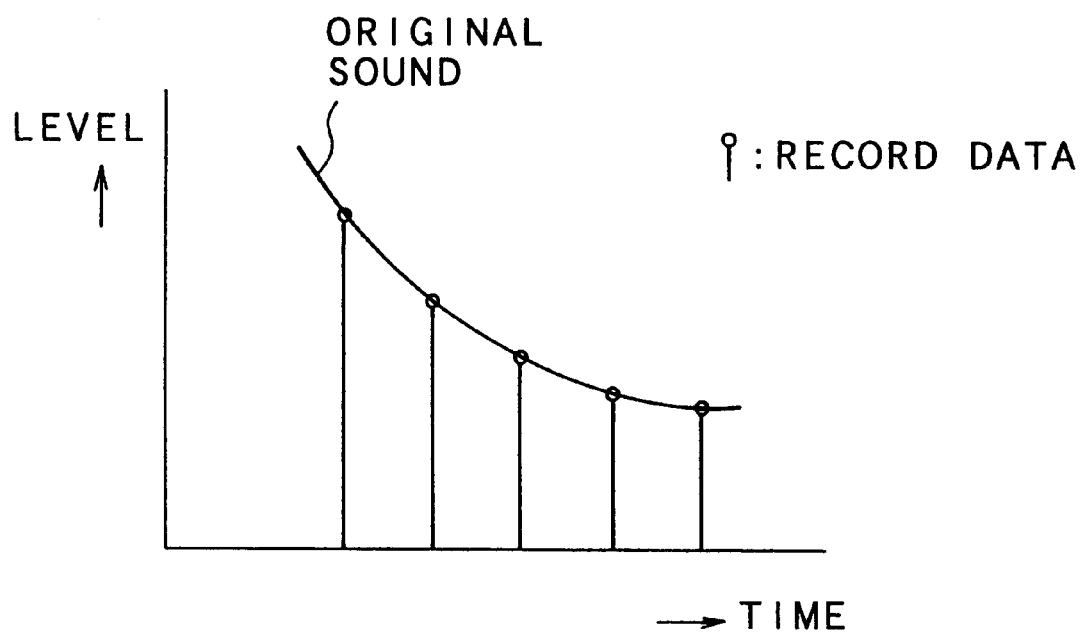
FIG. 4B is a graph showing the compression encoding process by means of the ATRAC with another bit allotment for the sound group.

FIG. 4A shows an example of the time width of the sound group which is relatively wide, while FIG. 4B shows an example of the time width of the sound group which is relatively narrow. By decreasing the time width of the sound group from that indicated by FIG. 4A to that indicated by FIG. 4B, the bit allotment amount in the level direction is increased, so that the encoded data (i.e., the record data) which has the level closer to that of the original sound can be obtained. Therefore, for example, in case that the echoes or aftertastes of the music composition is considered as an important factor in the classic music tone or genre, it is possible to record the encoded data in which the echoes or aftertastes are made precisely corresponding to the original sound. Consequently, the music sound with a little degradation in the quality can be obtained, by setting this time duration narrower.

(ii) Minimum Audible Limit Curve

The minimum audible limit curve is a curve which is obtained by plotting the sound pressure level audible for the ears of the human being versus the frequency. Namely, the sound component whose level is lower than this curve is not heard by the ears of the human being. The ATRAC encoder prepares a plurality of the minimum audible limit curves in advance, and performs the compression encoding process by selecting one of the curves. At the time of encoding, the sound (i.e., the sound signal) whose level is lower than this selected curve is basically removed or is encoded by use of a considerably small quantization bit number. Incidentally, both of the signal component which is not encoded at all and the signal component which is not encoded with an appropriate quantization bit number, by virtue of this minimum audible limit curve or the masking characteristic described later, are expressed as the signal which is "not encoded" in the description hereinbelow.

Figure 5A:
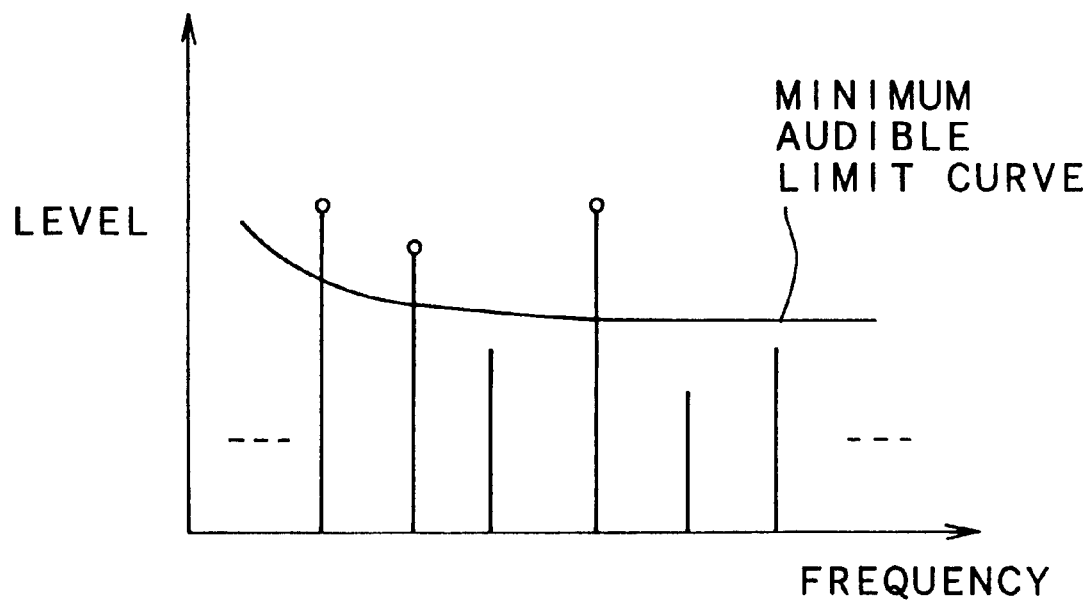
FIG. 5A is a graph showing the compression encoding process by means of the ATRAC with one time width for the sound group.
Figure 5B:
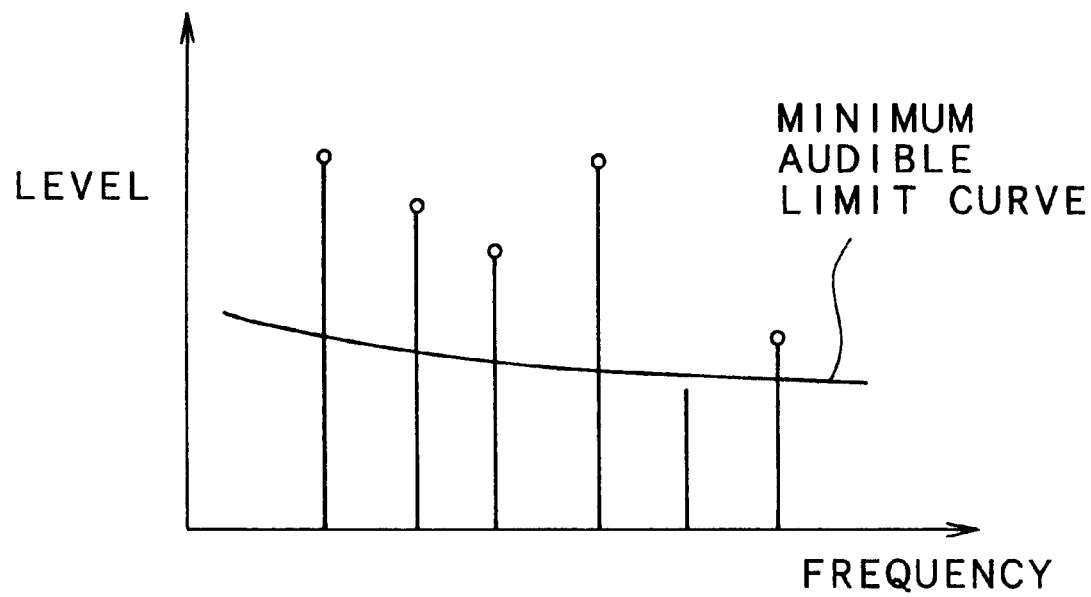
FIG. 5B is a graph showing the compression encoding process by means of the ATRAC with another time width for the sound group.

FIG. 5A and FIG. 5B shows examples of encoding signals same to each other (i.e., the signals whose spectrums are the same to each other) by use of minimum audible limit curves different to each other. More specifically, FIG. 5A shows the example of encoding the signal by use of the minimum audible limit curve whose level is relatively high, while FIG. 5B shows the example of encoding the signal by use of the minimum audible limit curve whose level is relatively low. From those figures, it is understood that the signal component, which is not encoded by use of the minimum audible limit curve as indicated by FIG. 5A, is actually encoded by use of the minimum audible limit curve as indicated by FIG. 5B. In case of the ATRAC, since the input signal is compression-encoded after dividing the input signal into the signal components in the 3 frequency bands i.e., the low band, the medium band and the high band, it is possible to record more the signal component in one particular band by setting low the minimum audible limit curve used for the this particular band. For example, it is general in ordinary music compositions that the level of the signal component in the high band is low as compared with the level of the signal component in the medium or low band (that is, the level of the signal component in the high band are relatively low). Therefore, in case that the signal component in the high band is to be considered as the important factor in the rock music tone or genre for example, it is possible to perform such a recording operation that the signal rich in the signal component in the high band can be obtained and recorded by selecting the minimum audible limit curve used for the high band whose level is relatively low. Alternatively, in case that the signal component in the high band is not really important in the classic music tone or genre for example, it is possible to perform such a recording operation that the signal rich in the signal component in the medium band can be obtained and recorded by selecting the minimum audible limit curve used for the medium band whose level is relatively low while setting high the minimum audible limit curve for the high band instead.

Figure 6A:
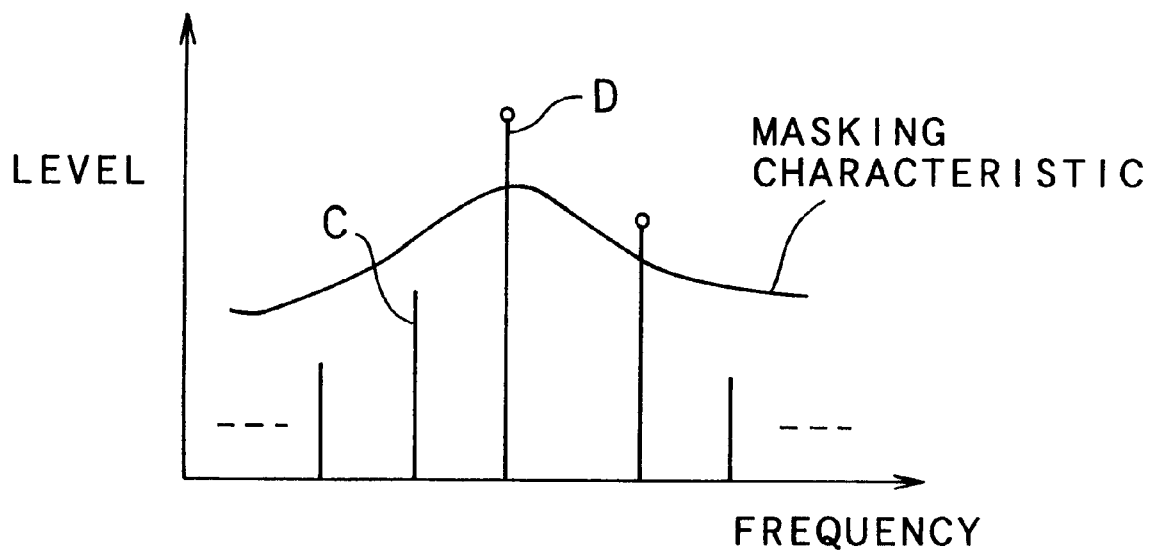
FIG. 6A is a graph showing the compression encoding process by means of the ATRAC with one masking characteristic.
Figure 6B:
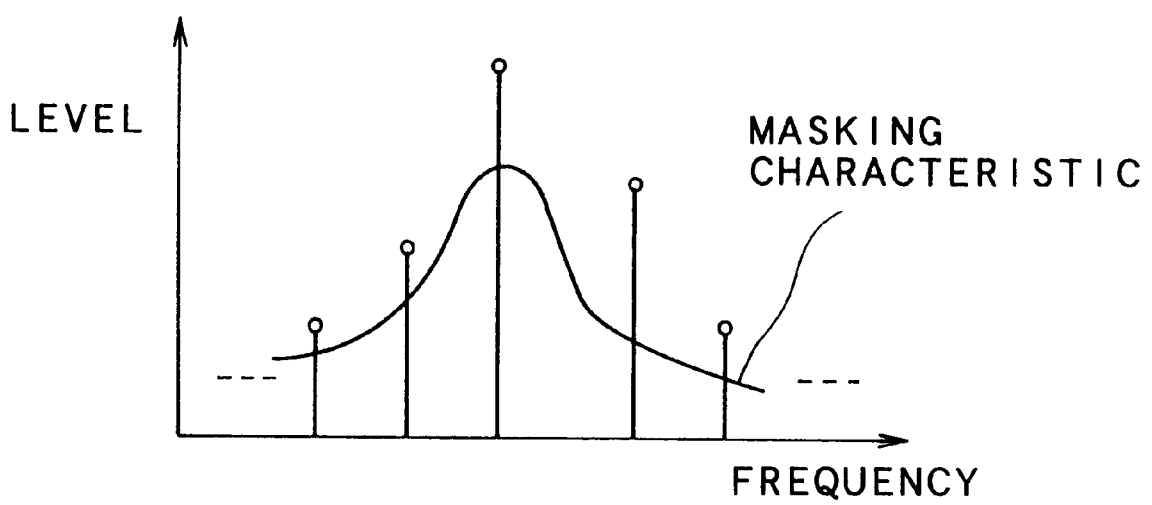
FIG. 6B is a graph showing the compression encoding process by means of the ATRAC with another masking characteristic.
Figure 7A:
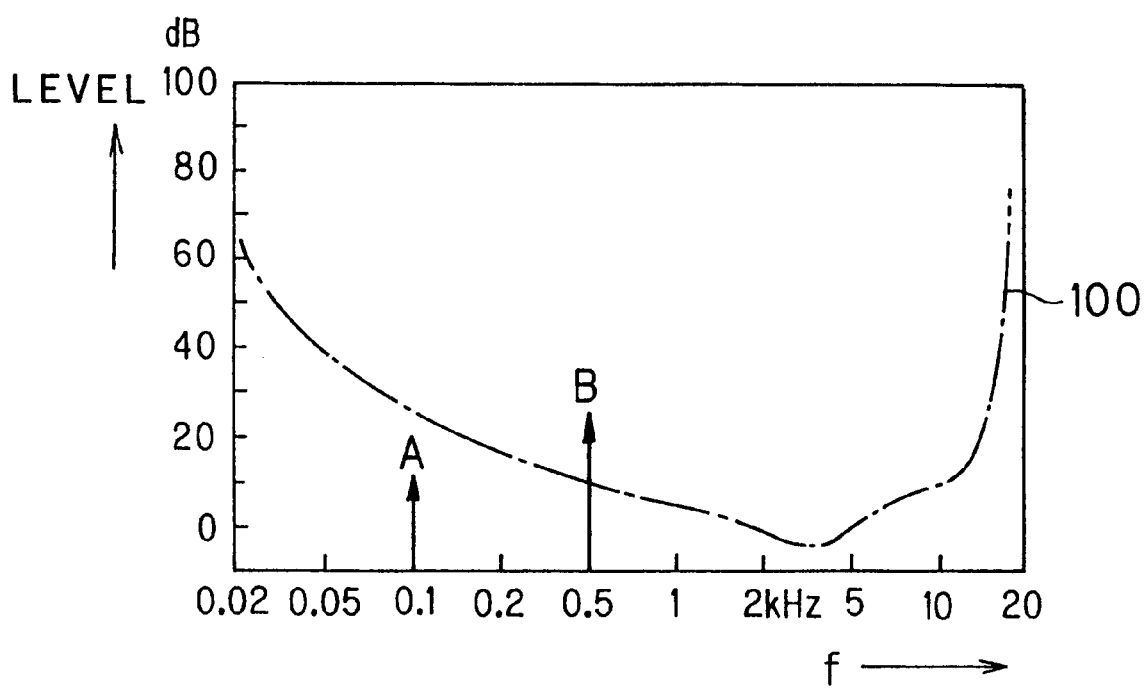
FIG. 7A is a graph indicating the minimum audible limit curve.
Figure 7B:
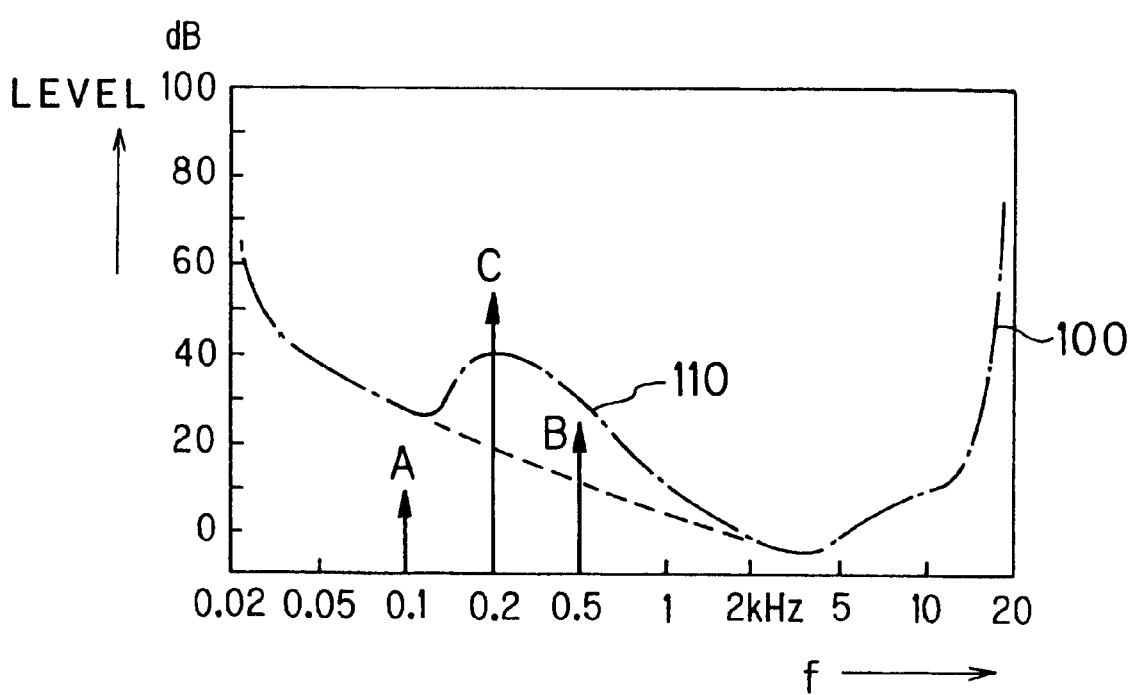
FIG. 7B is a graph indicating the minimum audible limit curve and a masking characteristic.

The judgment of the music tone or genre e.g., the judgment whether it is the rock music tone or genre or it is the classic music tone or genre is performed by the CPU 14 on the basis of the data received from the music tone analyzing unit 12. For example, if the signal having the peak level which is relatively high in the high band is periodically appeared, it is judged that the music tone or genre belongs to the rock music tone or genre. Or, if the signal having the level relatively high on the average in the medium band is continuously appeared without any drastic change, it is judged that the music tone or genre belongs to the classic music tone or genre. Incidentally, those are just examples, and there are many other ways to judge the music tone or genre according to various (iii) Masking Characteristic The masking characteristic is such a characteristic that, in case that a sound C and a sound D which is close to the sound C in the frequency and is large in the level simultaneously exist as shown in FIG. 6A and 6B, the sound C is not heard by the ears of the human being due to the existence of the sound D. FIG. 6A and FIG. 6B show the examples in which masking characteristics different from each other are applied to the signals having the spectrums same to each other. FIG. 6A shows the example in which the masking characteristic is relatively gentle while FIG. 6B shows the example in which the masking characteristic is relatively steep. As understood from those figures, the sound C is not encoded by use of the gentle characteristic as indicated by FIG. 6A, but is certainly encoded by use of the steep characteristic as indicated by FIG. 6B. Therefore, in case that the signal component whose level is relatively high often appears as in the music composition in the rock music tone or genre, it may be preferred to set the masking characteristic steep as indicated by FIG. 6B so as not to easily mask the sound at the vicinity of the signal having the high level.

As described above, according to the present invention, the music tone or genre of the signal to be recorded onto the MD is judged and the optimum characteristic for each parameter used for the ATRAC is selected and changed as the occasion demands on the basis of the result of the judgment. Further, the judgment of the music tone or genre and the selection of the characteristics are continually performed for each predetermined time width, which is preferably coincident to one sound group. Therefore, even in case that the music tone or genre is changed in the middle of one music composition, the characteristics are changed appropriately from time to time so as to follow this change. Consequently, it is possible to performs the encoding and recording processes in line with the music tone or genre of each individual music composition.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-233416 filed on Aug. 29, 1997 including the specification, claims, drawings and summary is incorporated herein by reference in its entirety.

What is claimed is:

1. A signal processing apparatus comprising:
    a music tone judging device for judging a music tone or genre of a music composition composed of an input audio signal;
    a selecting device for selecting one of a plurality of characteristics prepared in advance for each parameter used for a compression encoding method on the basis of a judgment result of said music tone judging device; and
    an encoding device for generating a spectrum signal out of the input audio signal and compression-encoding the generated spectrum signal on the basis of the selected characteristic.

2. A signal processing apparatus according to claim 1, wherein
    said music tone judging device continually judges the music tone or genre, and
    said selecting device selects one of the characteristics in a real time manner while the input audio signal is being inputted.

3. A signal processing apparatus according to claim 1, wherein said music tone judging device comprises:
    a band-dividing device for dividing the input audio signal into signal components in a plurality of frequency bands;
    a peak level detecting device for detecting a peak level of each of the signal components; and
    a peak level based judging device for judging the music tone or genre on the basis of the detected peak level.

4. A signal processing apparatus according to claim 3, wherein
    said band-dividing device comprises a plurality of filters each for only passing the signal component in respective one of the frequency bands, and
    said peak level detecting device comprises a plurality of level detecting circuits each for detecting the peak level.

5. A signal processing apparatus according to claim 1, wherein the characteristics include at least one of a minimum audible limit characteristic and a masking characteristic.

6. A signal processing apparatus according to claim 1, wherein the characteristics include at least one of a bit allotment and a time width of a time unit by which said encoding device compression-encodes the generated spectrum signal.

7. A signal processing apparatus according to claim 1, wherein said encoding device comprises an ATRAC (Adaptive TRansform Acoustic Coding) encoder.

8. A signal processing apparatus according to claim 1, further comprising an A/D (Analog to Digital) converter for converting the input audio signal from an analog form to a digital form, and outputting the input audio signal in the digital format to said music tone judging device and said encoding device.

9. An audio information recording apparatus comprising (i) a signal processing apparatus for processing an input audio signal to output a processed audio signal and (ii) a recording unit for recording the processed audio signal onto an information record medium,
    said signal processing apparatus comprising:
        a music tone judging device for judging a music tone or genre of a music composition composed of the input audio signal;
        a selecting device for selecting one of a plurality of characteristics prepared in advance for each parameter used for a compression encoding method on the basis of a judgment result of said music tone judging device; and
        an encoding device for generating a spectrum signal out of the input audio signal and compression-encoding the generated spectrum signal on the basis of the selected characteristic.

10. An audio information recording and reproducing apparatus comprising (i) a signal processing apparatus for processing an input audio signal to output a processed audio signal, (ii) a recording unit for recording the processed audio signal onto an information record medium and (iii) a reproducing section for reproducing the recorded audio signal from said information record medium,
    said signal processing apparatus comprising:
        a music tone judging device for judging a music tone or genre of a music composition composed of the input audio signal;
        a selecting device for selecting one of a plurality of characteristics prepared in advance for each parameter used for a compression encoding method on the basis of a judgment result of said music tone judging device; and
        an encoding device for generating a spectrum signal out of the input audio signal and compression-encoding the generated spectrum signal on the basis of the selected characteristic.

11. A signal processing method comprising:
    a music tone judging process of judging a music tone or genre of a music composition composed of an input audio signal;
    a selecting process of selecting one of a plurality of characteristics prepared in advance for each parameter used for a compression encoding method on the basis of a judgment result of said music tone judging process; and
    an encoding process of generating a spectrum signal out of the input audio signal and compression-encoding the generated spectrum signal on the basis of the selected characteristic.

12. A signal processing method according to claim 11, wherein
    said music tone judging process continually judges the music tone or genre, and
    said selecting process selects one of the characteristics in a real time manner while the input audio signal is being inputted.

13. A signal processing method according to claim 11, wherein
    said music tone judging process comprises:
        a band-dividing process of dividing the input audio signal into signal components in a plurality of frequency bands;
        a peak level detecting process of detecting a peak level of each of the signal components; and a peak level based judging process of judging the music tone or genre on the basis of the detected peak level.

14. A signal processing method according to claim 11, wherein the characteristics include at least one of a minimum audible limit characteristic and a masking characteristic.

15. A signal processing method according to claim 11, wherein the characteristics include at least one of a bit allotment and a time width of a time unit by which said encoding device compression-encodes the generated spectrum signal.

16. A signal processing method according to claim 11, wherein said encoding process comprises a process by means of an ATRAC (Adaptive TRansform Acoustic Coding) method.

* * * * *